H. PARKER.
Hand-Truck.

No. 161,436.

Patented March 30, 1875.

WITNESSES
F. H. Schott.
C. L. Eveerh.

INVENTOR
Henry Parker
per
Alexander & Mason
Attorneys

THE GRAPHIC CO. PHOTO-LITH. 39 & 41 PARK PLACE, N.Y.

UNITED STATES PATENT OFFICE.

HENRY PARKER, OF OTSEGO, ASSIGNOR OF THREE-FOURTHS OF HIS RIGHT TO JACOB JACOBSON, OF ST. JOSEPH, MICHIGAN.

IMPROVEMENT IN HAND-TRUCKS.

Specification forming part of Letters Patent No. 161,436, dated March 30, 1875; application filed September 5, 1874.

*To all whom it may concern:*

Be it known that I, HENRY PARKER, of Otsego, in the county of Allegan and in the State of Michigan, have invented certain new and useful Improvements in Freight-Loading Truck-Hooks; and do hereby declare that the following is a full, clear, and exact description thereof, reference being had to the accompanying drawings, and to the letters of reference marked thereon, making a part of this specification.

The nature of my invention consists in an attachment to the ordinary wheeled truck for conveying boxes, and barrels, and such articles, for the purpose of holding or retaining said boxes, &c., upon the truck, as will be hereinafter set forth.

Figure 1:
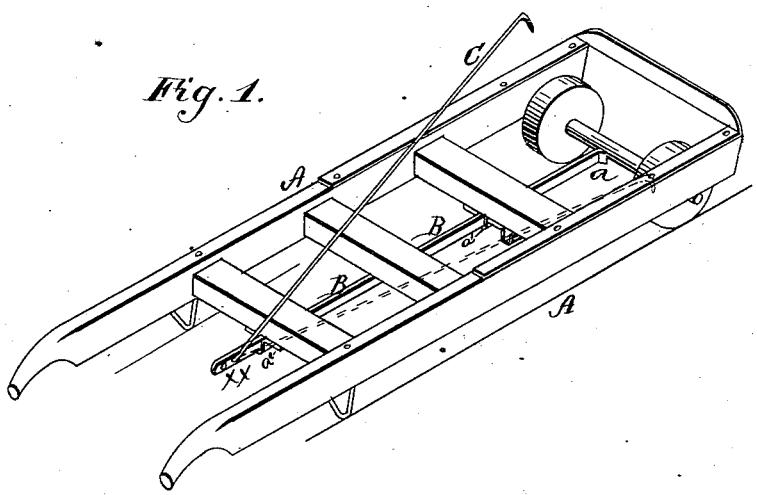
Figure 2:
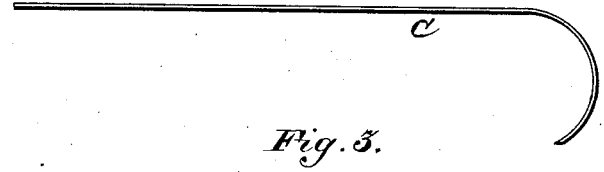
Figure 3:
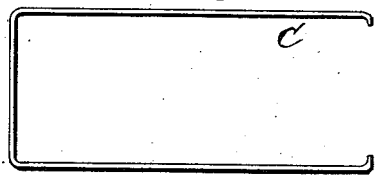

In the accompanying drawings making part of this specification, Figure 1 represents a perspective of my truck, and Figs. 2 and 3 are views of the different-shaped hooks I use.

In the figures, A represents the truck, which is constructed in any of the usual ways, having handles at one end and wheels at the other, and, as usual, is intended for conveying small freight of all descriptions from one point to another in warehouses or to vehicles for shipment. Beneath the truck, and connected to it by suitable loops $a'$ $a'$, is an iron bar, B, which has a hook, $a$, at one end to prevent it from slipping out of its loops, and an eye at its other, into which is hooked the bar or bars for holding the freight. This bar is allowed an endwise adjustment, in order to accommodate the holding-hooks to different-sized packages. C C represent hooked rods, of suitable length and size of hook to catch over boxes and other articles of freight to hold them on the truck. The hooked rods are hooked into the rear end of the bar B when in use, but when not in use are turned under the truck, and temporarily fastened to it in any suitable manner.

In Fig. 1 is seen a rod with a short sharp point, bent at right angles to the rod. In Fig. 2 a rod is seen with a large hook, for passing over bags and such articles, and in Fig. 3 is seen a two-pronged rod with two hooks, for catching over the chines of barrels.

I do not confine myself to any specific shape of hook.

My invention can be applied to any ordinary trucks now in use by adding thereto the loops $a'$ $a'$ on the under side of the cross-bars thereof.

I am aware that the employment of a hooked bar with a hand-truck is not new. With my invention the hook is easily adjusted to suit the merchandise on the truck, by means of the sliding bar B, and the hook itself can be folded under the truck and out of the way when it is not desired for use.

Having thus fully described my invention, what I claim as new, and desire to secure by Letters Patent, is—

In combination with an ordinary hand-truck, A, provided with the loops $a'$ $a'$ on the under edges of its cross-bars, the horizontally-sliding rod B, with hook $a$, and openings X X, and the rod C, with hooks at one end, and pivoted in the perforated end of the bar B, so as to be thrown over the top or folded under the bottom of the truck, substantially as set forth.

In testimony that I claim the foregoing I have hereunto set my hand this 14th day of August, 1874.

HENRY PARKER.

Witnesses:
CLARENCE E. WILBUR,
F. M. NEWMAN.